April 16, 1963     P. N. HANEBUTH     3,085,406
FLEXIBLE SHAFT ASSEMBLY
Filed Feb. 20, 1962

INVENTOR
Paul N. Hanebuth

By A. G. Douma
Attorney

United States Patent Office
3,085,406
Patented Apr. 16, 1963

1

3,085,406
FLEXIBLE SHAFT ASSEMBLY
Paul N. Hanebuth, Elmhurst, Ill., assignor to Stewart-Warner Corporation, Chicago, Ill., a corporation of Virginia
Filed Feb. 20, 1962, Ser. No. 174,530
7 Claims. (Cl. 64—2)

This invention relates to a flexible shaft assembly of the type including a flexible core having an outer protective casing, and in particular, to means to permit safe free flexure of the assembly within the designed range of curvatures.

A particular defect of flexible shafts is core kinking, which is caused by transverse bending of the core to a radius of curvature less than the recommended minimum. Under such circumstances the fibers of the core are strained past their elastic limit so that setting takes place to form a kink. Even after straightening the core, the kink in the flexible core remains to cause uneven operation, excessive noise with localized high strain contacts of the core and casing, whipping of the core in the casing, and accelerated fatigue failure.

Another particular defect of flexible shafts is a differential change of centerline arc lengths of the core and casing caused by transverse flexing of the assembly. Normally the core extends past the ends of the casing and includes some interlocking drive means such as drive tips or the like for connection to the driving and the driven members. Any differential in the core extension can create a thrust on the bearings of the driving and/or driven members to cause damage thereto. Additionally, a differential in the core extension can cause the core to buckle within the casing, again increasing the noise level, localized friction wear, and accelerating fatigue failure.

Acordingly, an object of this invention is to provide a flexible shaft assembly which eliminates and overcomes the above-mentioned defects.

Another object of this invention is to provide a protective casing for use with a flexible core wherein the casing will freely bend in a transverse direction to a minimum radius of curvature and thereafter positive interlocking means on the casing will resist further bending.

Another object of this invention is to provide bearing means securable to the flexible core which cooperate with the interior periphery of the protective casing, operable to maintain the centerline arc lengths of the core and casing substantially equal.

These and other objects of this invention will be more fully appreciated after a complete disclosure thereof given in the following specification and accompanying drawing forming a part thereof, wherein.

Figure 1:
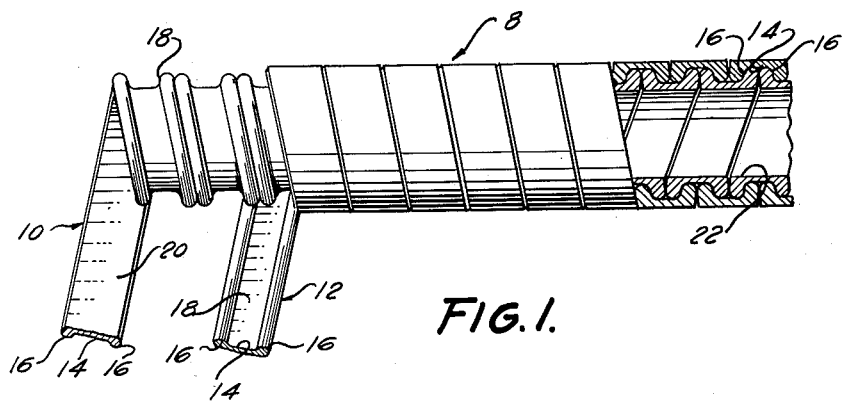
FIG. 1 is an elevational view of the protective casing used in the subject invention, the right end being partially broken away in longitudinal cross-section and the left end being shown in partially unwound fashion.

Referring now to FIG. 1, the subject casing 8 includes a pair of substantially identical continuous wire members 10 and 12 wound in a helical fashion concentrically of one another. Each of the elongated members 10 and 12 is generally C-shaped in cross-section and includes intermediate web portion 14 terminating at spaced end flanges 16 which define therebetween a channel 18. The C-shaped wire members 10 and 12 face each other and are staggered to overlap one another. Thus the flanges and channels of the member 10 of the inner helix blend with

2 the channels and flanges of the member 12 of the outer helix. The back side 20 of each wire member forms respectively the outer surface of the casing 8 and the inner surface of the bore 22 of the casing.

A core 24 is adapted to be received within the bore 22 of casing 8. The specific construction and characteristics of the core 24 are well known and need not be described herein. The subject invention includes disposing a plurality of bushing member 26 (only two being shown) at spaced intervals along the length of the core 24. The diameter of the bushing 26 is slightly less than the diameter of the casing bore 22 to form a bearing against the casing 8. The bushing 26 is formed from nylon, Teflon, or any of the other commonly known plastic bearing materials and is molded, shrunk-fit, or thermo-fit onto the core. The inner periphery of the bushing 26 thus attaches to the outer generally coarse periphery of the core 24 to ensure permanent mounting on the core.

The spacing of the bushings 26 on the core 24 sufficient to maintain the centerlines of the core and casing common upon transverse bending has been found to vary from 3 to 6 inches depending on size and flexibility of the core. The width of each bushing 26 is between ⅛ to ⅜ inch, depending in part on the smoothness of the periphery of bore 22. The reduced overall area engagement of the bushings 26 with the casing from full peripheral contact between the core and casing reduces friction; while the spaced limited bushing confinement of core 24 retains the true flexible characteristic of the core.

It will be understood that the core 24 is designed to bend freely in the transverse direction to some minimum radius of curvature. Any further bending of the core to a smaller radius of curvature is undesiable since it causes permanent damage or kinking of the core. The subject casing 8 eliminates the possibility of bending the core to a radius of curvature less than the minimum safe curvature. The casing and core thus can be handled in normal and even careless manner without fear of damaging the core.

Figures 3, 4:
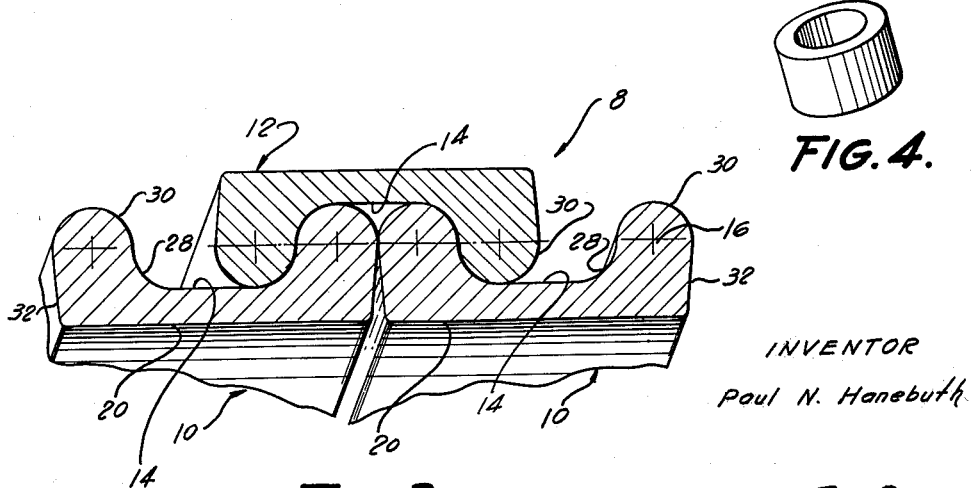
FIG. 3 is a greatly enlarged sectional view of the casing shown in FIGS. 1 and 2.
FIG. 4 is an annular bushing used with the core of FIG. 2.

FIG. 3 shows the C-shaped portions of two adjacent sections of the inner helix 10 and a single overlapping section of the outer helix 12. Each flange 16 curves in a generally concave fillet 28 from the intermediate web portion 14, around the convex free ends 30, to a slightly tapered edge 32. The tapers of the opposing edges 32 are slight, from 4 to 8 degrees, and converge in a direction away from the free ends 30 of the flanges 16. The cross-section of each wire member 10 and 12 is substantially identical and is symmetrical about a plane bisecting the intermediate web portion 14.

In order that the casing has true ball and socket action it is desirable that the arcuate contours be in the form of circles of equal radii. As can be noted in FIG. 3, the centers of curvature of the convex free ends 30 of the flanges, as well as the centers of the fillets 28 are all on a common line. When all radii are equal and the distance between the centers of the convex free ends of the flanges on each section is approximately equal to six times the radius, the flanges of adjacent sections of one helix are complementary with the channel of the opposite helix.

Figure 2:
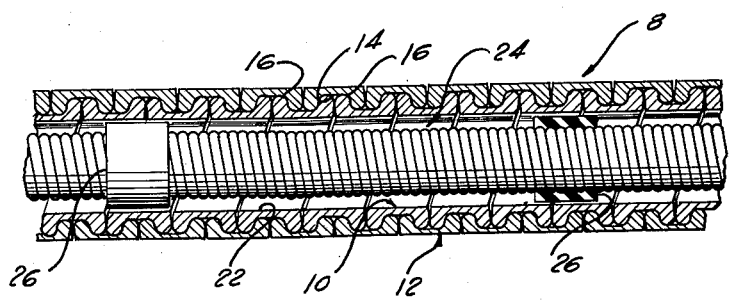
FIG. 2 is a longitudinal cross-sectional view of the core and casing assembly of the subject invention.

It will be noted that casing 8 as seen in FIGS. 1 and 2 is thus free to bend in a transverse direction, causing the arcuate interlocking contours to ride on one another. However, based on the angle of taper of edges 32, the separate members will bind on the edges at a given radius of curvature and become generally solid. Thereafter any effort to bend the casing further is resisted vigorously by the strength of the interlocked wire members.

Another particular advantage of the subject casing is that upon excess transverse bending, the overlapping wire members of the casing become completely disengaged to give visual evidence that the safe minimum radius of curvature has been exceeded. This is different from the conventional flexible shaft assembly where even after the minimum radius of curvature is exceeded no exterior visual detection is possible.

While only a single embodiment has been shown it will be obvious to those skilled in the art that many variations therein can be made without departing from the true inventive concept. It is thus desired that the invention be limited not by the disclosure but by the scope of the claims hereinafter following.

What is claimed is:

1. A flexible shaft assembly, comprising in combination, a casing having a pair of continuous wire members having substantially identical generally C-shaped transverse cross-sections each including a web and spaced flanges defining therebetween a channel, each of the C-shaped cross-sections having a generally smooth contour blending from the web around convex free ends of the flanges, the width of the channel being approximately twice the width of the flanges, the members being formed to substantially concentric helixes staggered to overlap one another and presenting the C-shaped contours toward one another, adjacent flanges of the respective members being received within the channels of the opposite member, said member of the inner helix defining a bore, a flexible core disposed within the bore, and a plurality of narrow plastic bearing members secured to the core at axially spaced intervals along the core, the bearing members being adapted to form a bearing contact with the peripheral surface of the bore.

2. A flexible shaft assembly, comprising in combination, a casing having a pair of continuous wire members having substantially identical generally C-shaped transverse cross-sections each including an intermediate web and a pair of spaced flanges defining therebetween a channel, each of the C-shaped cross-sections having an arcuate contour blending smoothly from the intermediate web, around convex free ends of the flanges, to slight opposing tapers converging in the direction away from the above-mentioned free ends, the distance across each channel along a given line between the flanges being substantially equal to twice the width of the flanges along the same line, the members being formd to substantially concentric helixes staggered to overlap one another and presenting the C-shaped contours toward one another, the flanges and channels of the member of the one helix cooperating with the channels and flanges of the member of the other helix, the member of the inner helix defining a generally uniform bore, a flexible core disposed within the bore, and a plurality of narrow annular plastic bushing members secured to the core at axially spaced intervals along the core, the outer peripheral surface of each bushing member being slightly smaller than said bore an dadapted to form a bearing contact with the peripheral surface thereof.

3. A flexible shaft assembly, comprising in combination, a casing formed from a pair of continuous wire members having substantially identical generally C-shaped transverse cross-sections each including an intermediate web and a pair of spaced flanges defining therebetween a channel, the contour of each C-shaped cross-section being arcuate and of uniform radii blending smoothly from the intermediate web, around convex free ends of the flanges, to slight opposing tapers converging in the direction away from the above-mentioned free ends, the centers of all of said radii being disposed generally on a common line between the centers of the convex free ends and the distance between the last-mentioned centers being approximately six times the radius, the members being formed to substantially concentric helixes staggered to overlap one another and presenting the C-shaped contours toward one another, the flanges and channels of the member of one helix blending with the channels and flanges of the member of the other helix, the back side of the member of the inner helix defining a generally uniform diameter bore, a flexible core disposed within the bore, and a plurality of narrow annular plastic bushing members secured to the core at axially spaced intervals of the order of 3 to 6 inches along the core, the width of each bushing member being of the order of ⅛ to ⅜ inch, and the outer peripheral surface of each bushing member being cylindrical of slightly smaller diameter than said bore adapted to form a bearing contact with the peripheral surface thereof.

4. For use in a flexible shaft assembly, a protective outer casing comprising in combination, a pair of continuous wire members having substantially identical generally C-shaped transverse cross-sections each including a web and a pair of spaced flanges defining therebetween a channel, each of the C-shaped cross-sections being of a continuous contour from the web, around convex free ends of the flanges, to slight opposing tapers converging in the direction away from the above-mentioned free ends, the distance across the channel between the flanges being approximately twice the width of the flanges along generally the same line, the members being formed to substantially concentric helixes staggered to overlap one another and presenting the C-shaped contours toward one another, the flanges and channels of the member of the one helix cooperating with the channels and flanges of the member of the other helix, and the member of the inner helix defining the bore of the casing.

5. For use in a flexible shaft assembly, a protective outer casing comprising in combination, a pair of continuous wire members having substantially identical generally C-shaped transverse cross-sections each including an intermediate web and a pair of spaced flanges defining therebetween a channel, each of the C-shaped cross-sections having arcuate contours of uniform radii blending smoothly from the web, around convex free ends of the flanges, to opposing tapers converging in the direction away from the above-mentioned free ends, the centers of all of said radii being disposed generally on a common line between the centers of the convex free ends and the distance between the last-mentioned centers being approximately six times the radius, the members being formed to substantially concentric helixes staggered to overlap one another and presenting the C-shaped contours toward one another, the flanges and channels of the member of the one helix blending with the channels and flanges of the member of the other helix, and the back side of the member of the inner helix defining the bore of the casing.

6. A flexible casing, comprising a first elongated continuous wire member generally C-shaped in transverse cross-section and including a web and a pair of spaced flanges defining therebetween a concave channel, a second elongated continuous wire member generally C-shaped in transverse cross-section and including a web and a pair of spaced flanges defining therebetween a concave channel, said first and second elongated members being wound in concentric helixes in overlapping relationship with the adjacent flanges of adjacent separate turns of the first member being received within the channels of adjacent turns of the overlapping second member, the flanges of the first and second members including arcuate contours extending transversely of the web of the respective member adapted in the wound relationship to complement one another and to abut one another, the thickness of two adjacent flanges of the first member being approximately equal to the width of the receiving channel of the overlapping second member as measured along generally the same line, and the member of the inner helix defining the bore of the casing.

7. For use in a flexible shaft assembly, a protective outer casing comprising in combination, a pair of continuous wire members each generally C-shaped in transverse cross-section and each including a web and a pair of spaced flanges extending transversely of the web and defining therebetween a concave channel, at least one of the members also having opposing end tapers blending smoothly with the contours of the flanges and converging slightly in the direction away from the free ends thereof toward the web, the members being formed to substantially concentric helixes staggered to overlap one another and presenting the C-shaped contours toward one another so that the flanges and channel of the member of one of the helixes cooperate with the channel and flanges of the member of the other of the helixes, whereat the adjacent flanges of adjacent turns of the one member abut one another on contact areas extending transversely of its web disposed on or closely proximate to the adjacent tapers, and simultaneously abut the flanges of the overlapping other member on contours extended transversely of its web spaced from the web, said adjacent flanges of the one member being approximately equal in thickness to the width of their receiving channel as determined on a common line in the direction of the web of the other member through the contact areas, and the member of the inner helix defining the bore of the casing.

References Cited in the file of this patent

UNITED STATES PATENTS

| | | |
|---|---|---|
| 1,055,263 | Fischer | Mar. 4, 1913 |
| 1,637,141 | Cooper | July 26, 1927 |
| 2,090,174 | Albright | Aug. 17, 1937 |
| 2,388,241 | Arens | Nov. 6, 1945 |
| 3,015,969 | Bratz | Jan. 9, 1962 |